(12) United States Patent
Kikkawa et al.

(10) Patent No.: US 7,331,742 B2
(45) Date of Patent: Feb. 19, 2008

(54) SPINDLE UNIT OF MACHINE TOOL

(75) Inventors: Yasuhiko Kikkawa, Yamanashi (JP);
Haruyuki Shiraishi, Yamanashi (JP);
Masahiro Maeda, Yamanashi (JP);
Naoya Sumita, Yamanashi (JP); Kunio Yamaguchi, Yamanashi (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 87 days.

(21) Appl. No.: 10/561,518

(22) PCT Filed: Jun. 23, 2004

(86) PCT No.: PCT/JP2004/009231

§ 371 (c)(1),
(2), (4) Date: Dec. 20, 2005

(87) PCT Pub. No.: WO2004/112999

PCT Pub. Date: Dec. 29, 2004

(65) Prior Publication Data
US 2007/0098511 A1 May 3, 2007

(30) Foreign Application Priority Data
Jun. 24, 2003 (JP) .............................. 2003-179879
Mar. 31, 2004 (JP) .............................. 2004-102631

(51) Int. Cl.
*B23B 31/30* (2006.01)
(52) U.S. Cl. .................. 409/233; 409/232; 408/239 R
(58) Field of Classification Search ................ 409/233, 409/232, 231, 135, 136; 408/239 R, 240; 267/64.11, 119, 130
See application file for complete search history.

(56) References Cited

U.S. PATENT DOCUMENTS

| 4,303,360 A | * | 12/1981 | Cayen et al. ............... 409/233 |
| 5,096,347 A | * | 3/1992 | Kumagai et al. ........... 409/233 |
| 5,125,234 A | * | 6/1992 | Yonezawa et al. .......... 409/233 |
| 5,222,285 A | | 6/1993 | Horikawa |
| 6,896,455 B2 | * | 5/2005 | Anderson .................... 409/233 |
| 2004/0033116 A1 | * | 2/2004 | Anderson .................... 409/233 |

FOREIGN PATENT DOCUMENTS

| JP | 2-049843 B2 | 10/1990 |
| JP | 7-27041 Y2 | 6/1995 |
| JP | 11-309614 A | 11/1999 |
| JP | 2002-18610 A | 1/2002 |

OTHER PUBLICATIONS

Computer Generated Translation from JPO website of JP2002-018610 (cited on IDS dated Dec. 20, 2005).*

* cited by examiner

*Primary Examiner*—Dana Ross
(74) *Attorney, Agent, or Firm*—Morrison & Foerster LLP

(57) ABSTRACT

A hollow portion of a spindle through which a draw bar and a disc spring assembly are inserted has a closed chamber structure and constitutes an oil pool chamber in which a lubricating oil is filled. The bearing portions that support the draw bar in the oil pool on both sides have the same inner diameter so that the volume of the oil pool chamber does not change when the draw bar is moved forward and backward. As a result, the lubricating oil is not pushed out of the oil pool chamber. Thus, a spindle unit can be provided in which a clamping device including the draw bar and the disc spring assembly for clamping a tool or a workpiece pallet at the forward end of the spindle can be reliably lubricated, so that the friction on and the breakage of the clamping device is reduced and that the service life of the unit is lengthened.

4 Claims, 4 Drawing Sheets

SPINDLE UNIT OF MACHINE TOOL

TECHNICAL FIELD

The present invention relates to a spindle unit for mounting a tool on a forward end of a rotary spindle of a machine tool or a spindle unit for mounting a workpiece pallet on the forward end of a rotary spindle of a rotary table or the like. In particular, the present invention relates to a spindle unit in which an engaging member such as a pull stud mounted on a tool or a workpiece pallet is held by a collet provided at the forward end of a draw bar, which is pulled in by the urging force of an elastic member, such as a disc spring, to thereby mount the tool or the workpiece pallet on the forward end of the rotary spindle.

BACKGROUND ART

Generally, a spindle unit used with a machine tool includes a clamping means for clamping a tool or a workpiece pallet in a hollow portion of a spindle mounted rotatably in a housing. A conventional spindle unit is described, for example, in FIG. 1 of Japanese Patent Publication No. 2-49843 or FIG. 7 of U.S. Pat. No. 5,222,285. A clamping means for clamping a tool or a workpiece pallet is configured of a draw bar inserted into a hollow portion of a spindle and a disc spring for applying an urging force to the draw bar. A collet is provided at the forward end of the draw bar to hold a pull stud mounted on the tool or the workpiece pallet. A plurality of disc springs mounted concentrically on the draw bar cooperate to apply the urging force to the draw bar so that the tool or the workpiece pallet can be clamped at the forward end of the spindle. When releasing the tool or the workpiece pallet, a cylinder-and-piston mechanism constituting an unclamping means and provided rearward of the spindle pushes the draw bar forward to thereby release the tool or the workpiece pallet from a mounting means provided at the forward end of the spindle.

The clamping means provided in the hollow portion of the rotary spindle of the spindle unit, i.e. a mechanism including the draw bar and the disc springs is supplied with a lubricant, in order to lengthen the life of the unit by reducing the wear on, and breakage of, each disc spring. In the prior art, the method of lubricating the clamping means include a grease filling method in which grease is filled, a lubricating oil circulation method in which lubricating oil is circulated and a lubricating oil filling method in which lubricating oil is filled in an oil pool. However, in the grease filling method, the grease is splashed off by the high-speed rotation of the spindle or melted by the heat generated by the spindle and, therefore, the spindle is not lubricated sufficiently. As a result, the disc spring is worn or broken, and the unit life is shortened. The lubricating oil circulation method has a disadvantage that it is very difficult to supply the lubricating oil from an external source into the spindle in rotation and circulate it in the spindle, thereby making the unit complicated and expensive. In the lubricating oil filling method, as described in detail with reference to the conventional spindle unit shown in FIG. 4, the volume of the oil pool can change when the draw bar is moved forward and backward. Thus, a problem is posed in which, due to a long operation, the lubricating oil is pushed out of the oil pool and gradually reduced to such an extent that the clamping means cannot be reliably lubricated.

SUMMARY OF THE INVENTION

The present invention has been directed to the spindle unit of the lubricating oil filling type described above and has been achieved to solve the problem thereof. An object of the present invention is to provide a spindle unit, of a machine tool, in which a device for lubricating a clamping means for clamping a tool or a workpiece pallet is simple, and the clamping means can be reliably lubricated to thereby reduce a wear or breakage of the clamping means and lengthen a service life of the unit.

BRIEF DESCRIPTION OF THE DRAWING

In order to achieve the object described above, there is provided a spindle unit of a machine tool for mounting a tool or a workpiece pallet on a forward end of a spindle, which includes a spindle supported by a housing so as to be rotatable; a clamping means provided in a hollow portion of the spindle and including a draw bar for engaging the tool or the workpiece pallet and an elastic member for pulling the draw bar rearward; an unclamping means provided at a rear portion of the spindle for pushing the draw bar to thereby release the tool or the workpiece pallet; and an oil pool chamber formed in the hollow portion of the spindle to have a closed chamber structure and including bearing portions for supporting the draw bar on both sides thereof to be movable forward and rearward, the bearing portions having substantially the same size so that the volume of the oil pool chamber does not change when the draw bar is moved forward and rearward.

As described above, the oil pool chamber for containing the lubricating oil is formed to have a closed chamber structure and the bearing portions for supporting the draw bar on the two sides thereof are formed to have substantially the same size. Further, the spindle unit is configured so that the volume of the oil pool chamber does not change when the draw bar is moved forward and rearward. Due to such a configuration, the oil pool chamber can be fully filled with the lubricating oil, and the lubricating oil is not pushed out or reduced even when the draw bar is moved forward and rearward with the lubricating oil fully filled in the oil pool chamber. As the whole clamping means is always reliably lubricated, wear and breakage of the clamping means is reduced, thereby lengthening the life of the spindle unit of the machine tool.

Figure 1:
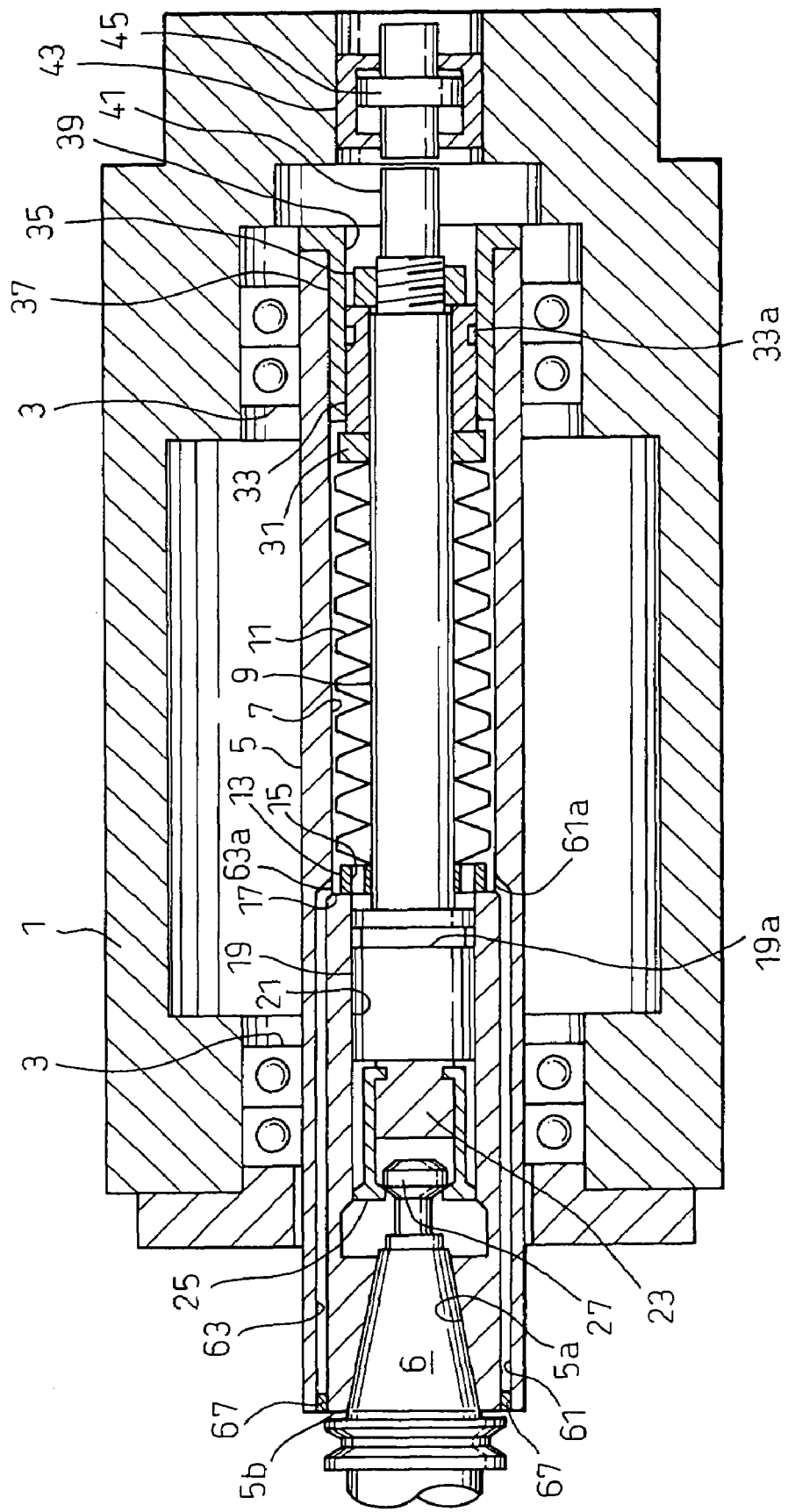

Also, there is provided a spindle unit of a machine tool, wherein the bearing portions comprises a front cylindrical bearing portion 21 for fitting therein a support shaft portion 19 of the draw bar 9 and a rear cylindrical bearing portion 39 for fitting therein a shaft collar 33 fixed on the draw bar 9, and the oil pool chamber is configured such that an inner diameter size of the front cylindrical bearing portion 19 is equal to an inner diameter size of the rear cylindrical bearing portion 39. Due to this configuration, when the clamping means or the unclamping means is activated to move the draw bar 9 forward and rearward, the volume of the oil pool chamber does not change at all. As a result, the lubricating oil is kept fully filled and is not pushed out or reduced.

Also, there is provided a spindle unit of a machine tool wherein the spindle includes at least two passages which provide communication between an outside of the spindle and the oil pool chamber, and the openings of the two passages to the oil pool chamber are formed to be spaced apart from each other at angular interval of about 180 degrees about center axis of the spindle. Due to this configuration, in changing of lubricating oil, the spindle is stopped with the two passages thereof arranged at upper and lower positions and the two passages are opened so that the old lubricating oil in the oil pool chamber is discharged from the lower passage. A lubricating oil filling means in which new lubricating oil is contained is connected to the lower passage and the new lubricating oil is injected into the oil pool chamber. Once the lubricating oil comes to spill out the upper passage, it indicates that the lubricating oil is fully filled in the oil pool chamber. Therefore, the lubricating oil filling means is removed and the two passages are closed by screw plugs or the like. In this way, the lubricating oil in the oil pool chamber can be easily changed.

BRIEF DESCRIPTION OF THE DRAWING

FIG. 1 is a sectional view of a spindle unit of a machine tool according to the present invention.

Figure 2:
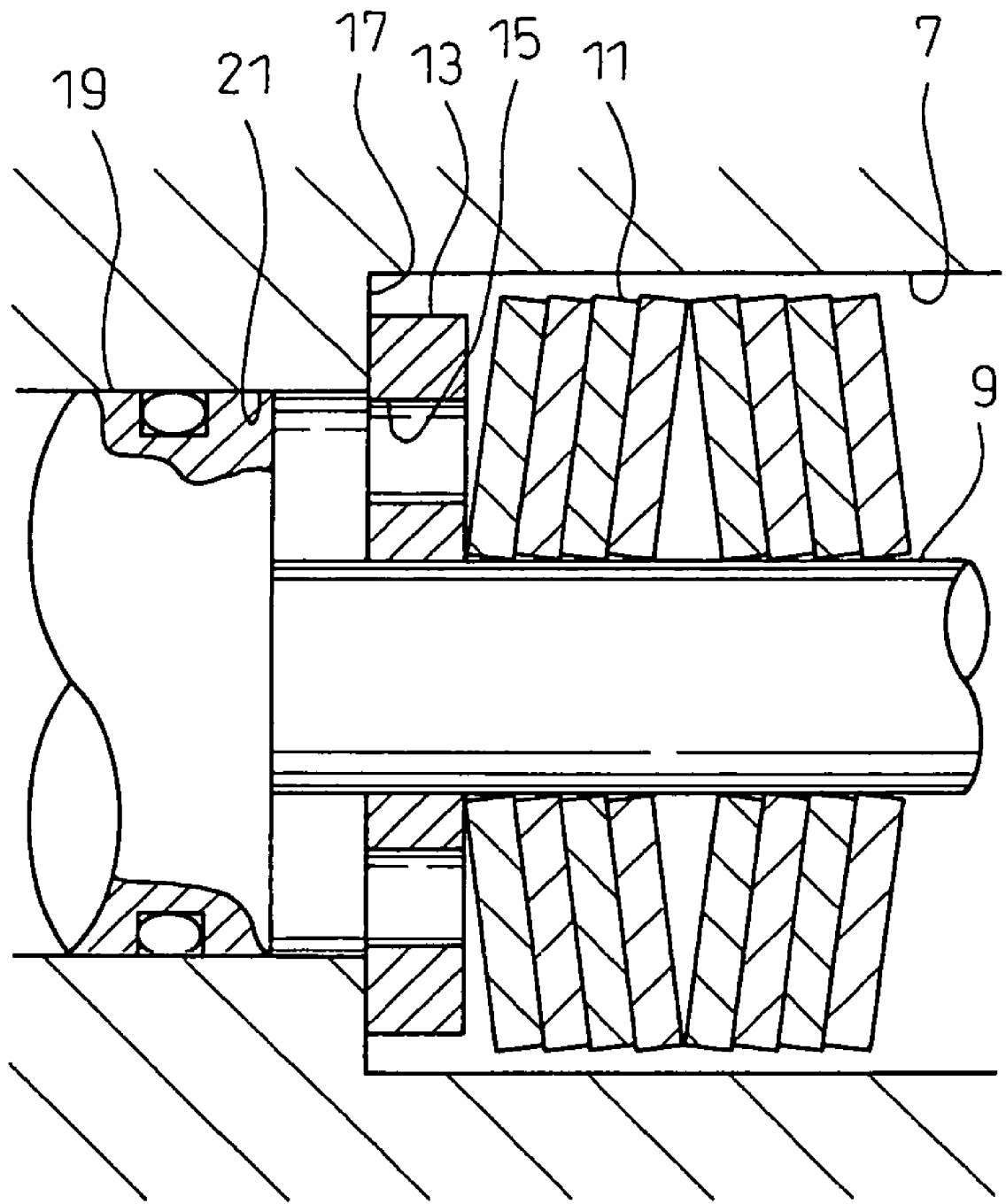

FIG. 2 is a detail view showing in enlarged scale a part of a clamping means.

Figure 3:
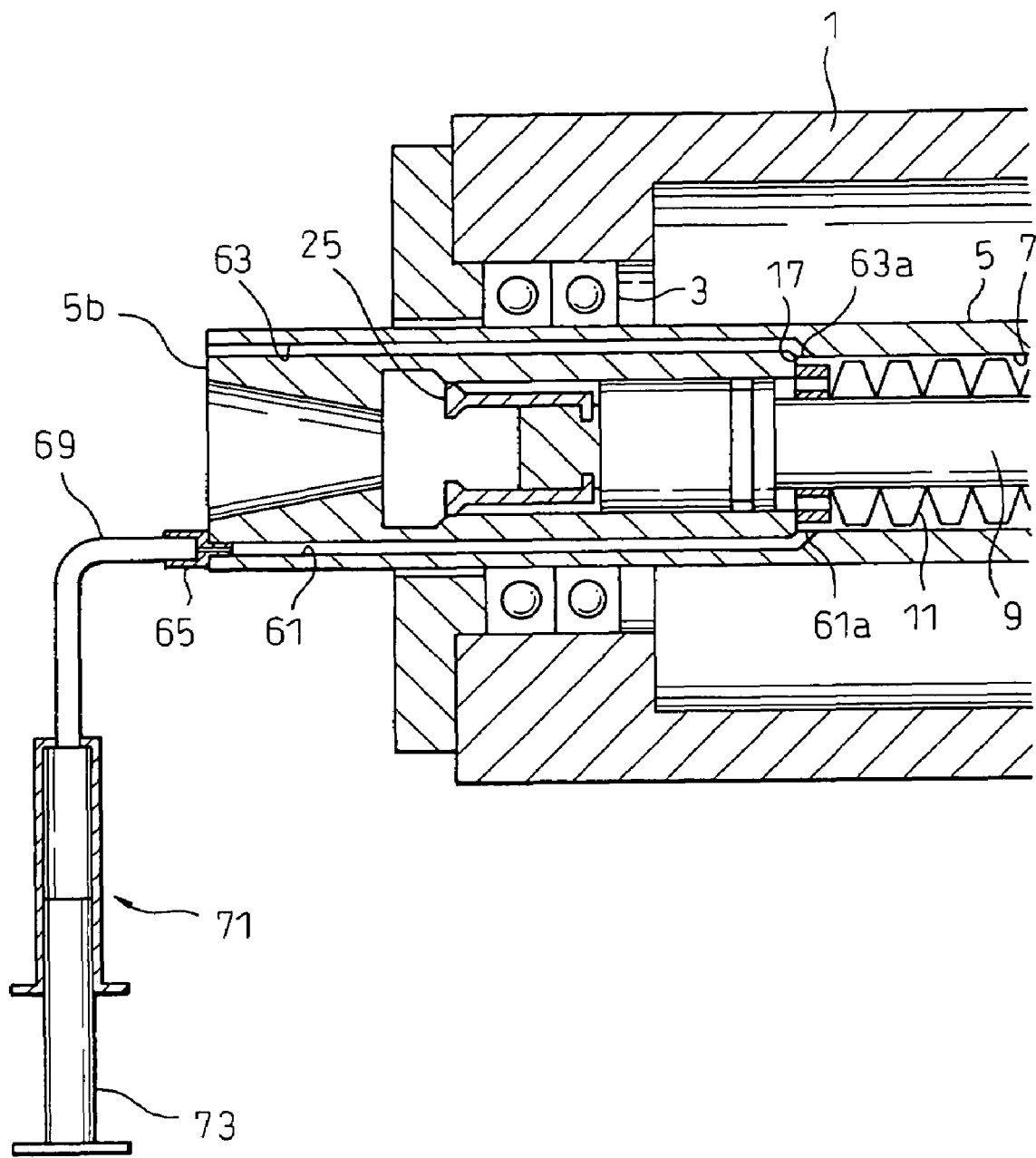

FIG. 3 is a partly enlarged sectional view showing an embodiment in which lubricating oil can be changed.

Figure 4:
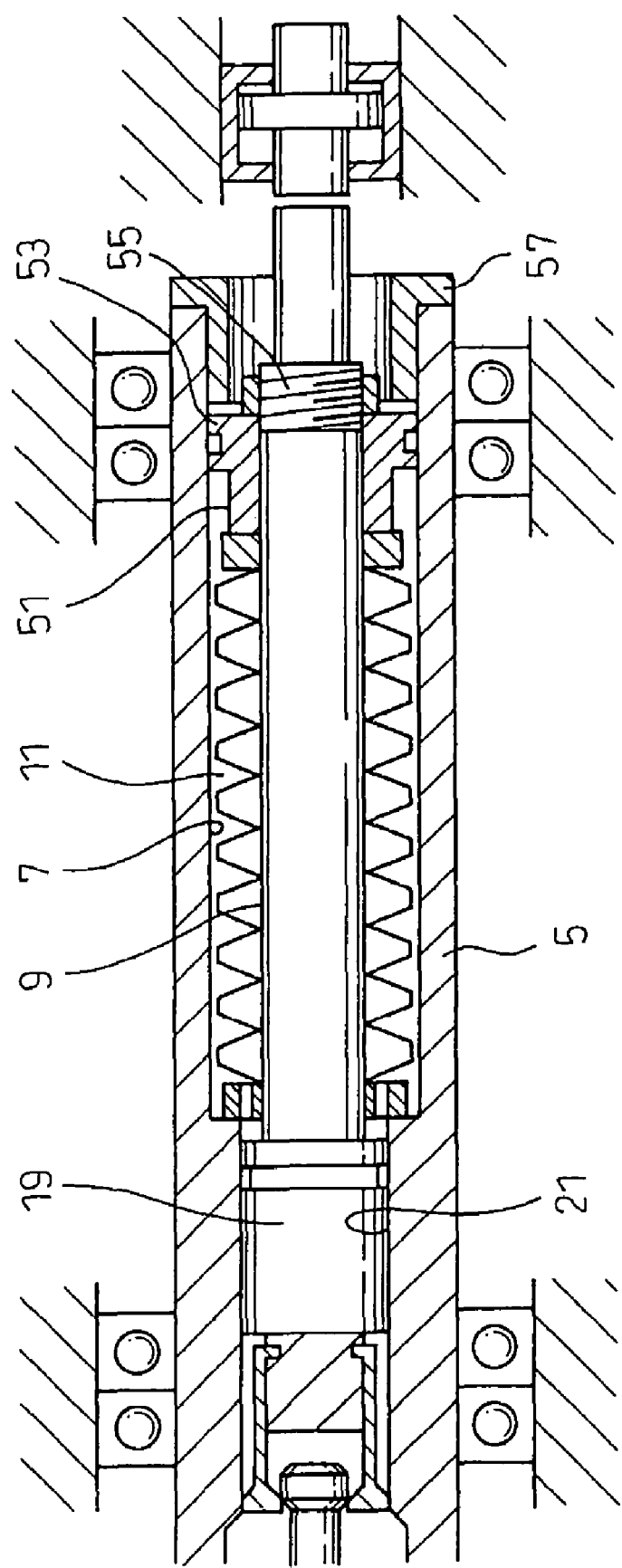

FIG. 4 is a sectional view of a spindle unit of a conventional machine tool.

DETAILED DESCRIPTION OF THE INVENTION

An embodiment of the present invention will be described with reference to the accompanying drawings, wherein FIG. 1 is a sectional view of a spindle unit of a machine tool according to the present invention; FIG. 2 is a detail view showing in enlarged scale a part of the clamping means of the spindle unit shown in FIG. 1; FIG. 3 is a diagram for explaining a method of changing lubricating oil in an oil pool; and FIG. 4 is a sectional view of a spindle unit of a conventional machine tool.

In FIG. 1, a spindle unit has a spindle 5 rotatably supported by a housing 1 through a bearing 3. The spindle 5 can be rotated and positioned by a known built-in motor or the like, not shown. The spindle 5 is formed at the forward end (left end in FIG. 1) thereof with a taper hole 5a for mounting a taper shank 6 of a tool or a workpiece pallet. A clamping means for fixing the tool or the workpiece pallet on the spindle 5 is provided in a hollow portion 7 of the spindle 5. In this embodiment, the clamping means includes a draw bar 9 inserted into the hollow portion 7 along a center axis of the spindle 5 and a disc springs assembly 11 consisting of a plurality of disc springs mounted on the draw bar 9. More specifically, the disc spring assembly 11 is formed of a plurality of disc spring sets, each consisting of a plurality of (for example, four) disc springs stacked facing the same direction, which are mounted on the draw bar 9 so that they are arranged alternately back to back. Although a disc spring is used as an elastic member in this embodiment, other type of elastic member such as a coil spring can be used.

The hollow portion 7 of the spindle 5 forms an oil pool chamber of a closed chamber structure. This oil pool chamber is fully filled with lubricating oil for lubricating the disc spring assembly 11, etc. The forward end (left end in FIG. 1) of the disc spring assembly 11 is in contact with a contacting portion 17 of the spindle 5 through a collar 13. The collar 13 is formed with a hole 15 for allowing the lubricating oil to pass therethrough. The lubricating oil is supplied to the oil pool chamber through passages 61 and 63 described later, which passages are closed by screw plugs 67.

A support shaft portion 19 formed forward of the draw bar 9 is supported, by a front cylindrical bearing portion 21 provided in the hollow portion 7 of the spindle 5, so as to be slidable in an axial direction. The support shaft portion 19 is formed with a peripheral groove 9a for mounting therein an O-ring for sealing the oil pool chamber to prevent the leakage of the lubricating oil in the oil pool chamber. The O-ring is mounted in the peripheral groove 19a. A collet 25 is provided at the forward end 23 of the draw bar 9 to hold a pull stud 27 mounted on the tool or the workpiece pallet. The draw bar 9 and the disc spring assembly 11 constitutes a clamping means to clamp the tool or the workpiece pallet at the forward end of the spindle 5.

The rear end (right end in FIG. 1) of the disc spring assembly 11 is in contact with the shaft collar 33 through the collar 31, and the shaft collar 33 is fixed on the draw bar 9 by a nut 35. The shaft collar 33 fixed on the draw bar 9 is slidably supported by an inner surface 39 of a bearing 37 mounted in the hollow portion 7 of the spindle 5, which inner surface constitutes a rear cylindrical bearing portion. The bearing 37 forms a stopper against which the collar 31 abuts to limit the rearward movement of the draw bar 9. The shaft collar 33 is formed with a peripheral groove 33a for mounting therein an O-ring for sealing the oil pool chamber to prevent the leakage of the lubricating oil in the oil pool chamber. The C-ring is mounted in the peripheral groove 33a.

The disc spring assembly 11 is inserted over the draw bar 9 in a preloaded state and, by pulling in the draw bar 9 rearward by an urging force of the disc spring assembly 11, the tool or the workpiece pallet is clamped on the spindle 5. Behind the rear end 41 of the draw bar 9, an unclamping means constituted by a cylinder 43 and a piston 45 is mounted on the housing 1. The piston 45 pushes the rear end 41 of the draw bar 9 forward and the collet 25 releases the pull stud 27, so that the tool or the workpiece pallet is unclamped. As the unclamping means is a known device, a detailed description thereof is omitted.

In this embodiment, the bearing portions for slidably supporting the above-described draw bar 9 on the two sides thereof, i.e. the front cylindrical bearing portion 21 and the rear cylindrical bearing portion 39 have inner diameters of the same size. As the bearing portions for supporting the draw bar 9 on the two sides thereof have the inner diameter of the same size, the volume of the oil pool chamber formed in a closed chamber structure remains unchanged even when the clamping means or the unclamping means is activated to move the draw bar 9 forward or backward. In view of the fact that the volume of the oil pool chamber does not change even when the draw bar 9 is moved, the lubricating oil can be always fully filled without being pushed out of the oil pool chamber.

FIG. 2 is a detail view showing in enlarged scale a part of the clamping means of the spindle unit shown in FIG. 1. The clamping means for clamping the tool or the workpiece pallet is configured such that the draw bar 9 can be urged rearward by a predetermined clamping force by the disc spring assembly 11 having a plurality of disc spring sets consisting of four disc springs which disc spring sets are alternately arranged back to back in the draw bar 9. As the reference numerals in FIG. 2 are identical with those of FIG. 1, respectively, the description thereof is not omitted.

Referring to FIG. 3, a method of discharging and filling the lubricating oil in the oil pool will be described. After the operation of the clamping means and the unclamping means are repeated over a long period of time with the lubricating oil fully filled in the oil pool chamber, the lubrication performance of the lubricating oil is deteriorated. Therefore, the lubricating oil in the oil pool chamber should be changed. A structure and a method for changing the lubricating oil in the oil pool chamber are as follows.

The spindle 5 has passages 61, 63 which are in communication with the oil pool chamber. The passages 61, 63 extend in a longitudinal direction from the forward end surface 5*b* of the spindle 5 into the oil pool chamber and are arranged at angular positions spaced apart from each other at angular interval of about 180 degrees about the center axis of the spindle 5. Especially, it is important that the inner openings 61*a*, 63*a* of the passages 61, 63 opening to the oil pool chamber of the spindle 5 are arranged at the angular positions spaced apart from each other at angular interval of about 180 degrees about the center axis of the spindle 5 and are adapted to be arranged in the lower and upper sides of the oil pool chamber, respectively. The spindle 5 is rotationally positioned so that one passage arranged at the lower side can be used as a passage for lubricating oil and the other passage arranged at the upper side can be used as a passage for air. In FIG. 3, for the convenience of explanation, the passage 61 is assumed to be used as a passage for lubricating oil and the passage 63 is assumed to be used as a passage for air.

Each of the lubricating oil passage 61 and the air passage 63 is formed at the forward end thereof with an inner thread, which engages with a pipe joint 65 or a screw plug 67 having an outer thread engageable with the inner thread of the passage. The pipe joint 65 can be connected with a container 71 of injector type (constituting a lubricating oil filling means) through a tube 69. The injector-type container 71 contains new lubricating oil to be filled in the oil pool chamber of the spindle 5.

In normal use, the forward ends of the lubricating oil passage 61 and the air passage 63 are engaged with the screw plugs 67 to prevent the lubricating oil from leaking out of the oil pool chamber. When the lubricating oil in the oil pool chamber is changed, the spindle 5 is positioned so that the lubricating passage 61 is arranged on the lower side and the air passage 63 is arranged on the upper side, as shown in FIG. 3. Then, the screw plug 67 is removed from the lubricating oil passage 61 arranged on the lower side, after which the screw plug 67 is removed from the air passage 63. Once the screw plug 67 is removed from the air passage 63, the old lubricating oil is discharged from the lubricating oil passage 61 while air is sucked through the air passage 63. At this time, the old lubricating oil is received by a container such as a vat (not shown).

Next, the pipe joint 65 is engaged with the forward end of the lubricating oil passage 61, and the tube 69 coupled to the injector-type container 71 is then connected to the pipe joint 65. By pushing in the piston 73 of the injector-type container 71, the new lubricating oil in the injector-type container 71 is injected into the oil pool chamber of the spindle 5. In this process, the lubricating oil is preferably fully filled until it spills out of the air passage 63 arranged on the upper side so that no air may be left in the oil pool chamber of the spindle 5.

Next, the screw plug 67 is screwed into the air passage 63 arranged on the upper side to thereby close the air passage 63 in order to prevent the new lubricating oil already filled from flowing out of the lubricating oil passage 61 on the lower side. Next, the pipe joint 65 is removed, and the screw plug 67 is then screwed in its place to thereby finish the job of changing the lubricating oil. Thus, the job of changing the lubricating oil which is carried out for example, once every six months, can be easily carried out in the machine tool operation field. Instead of the injector-type container 71, other type of lubricating oil filling means such as a manual or electrically-operated pump may be used.

Although the horizontal spindle 5 has been described in the embodiment shown in FIG. 3, the present invention can be applied to a vertical spindle 5. In this case, the lubricating oil passage 61 is formed so as to extend from the lower end surface or lower side surface of the spindle and to be in communication with a lower portion of the oil pool chamber, while the air passage 63 is formed so as to extend from the upper end surface or upper side surface of the spindle and to be in communication with the upper portion of the oil pool chamber.

FIG. 4 shows a spindle unit of a conventional machine tool. The essential parts of this spindle unit have the same configuration as those described in FIG. 1, and only the difference from FIG. 1 will be described. A shaft collar 51 is mounted by a nut 55 on the rear portion of the draw bar 9. A rear cylindrical bearing portion 54 extending in the rear end of the spindle 5 is provided in the hollow portion 7 of the spindle 5. A ring-shaped protrusion 53 of the shaft collar 51 is fitted in the rear cylindrical bearing portion 54 of the hollow portion 7 of the spindle 5 and partitions the hollow portion 7 to form the oil pool chamber having a closed chamber structure. A stopper 57 is mounted on the rear end of the spindle 5. The conventional spindle unit is lubricated by filling grease in or supplying lubricating oil to this oil pool chamber. In some types of spindle units, though not shown, lubricating oil is supplied from an external source by a circulation unit to circulate it in the spindle unit.

In the conventional spindle unit, the size of an inner diameter is different between the two bearing portions for supporting the draw bar 9 on both sides thereof, i.e. between the front cylindrical bearing portion 21 and the rear cylindrical bearing portion 54. Generally, in order to allow a part such as the disc spring assembly 11 to be inserted into the rear cylindrical bearing portion 54, the rear cylindrical bearing portion 54 is made to have an inner diameter larger than that of the front cylindrical bearing portion 21. Due to this structure, the volume of the oil pool chamber changes when the clamping means or the unclamping means is activated to move the draw bar 9 forward and backward. Specifically, the forward movement of the draw bar 9 decreases the volume of the oil pool chamber, and the backward movement of the draw bar 9 increases the volume of the oil pool chamber. If the volume of the oil pool chamber changes in this manner by moving the draw bar 9, the oil pool chamber cannot be fully filled with grease or lubricating oil. The change in the volume of the oil pool chamber due to the movement of the draw has an effect to gradually pushes the lubricating oil out of the oil pool chamber during a long period of time and results in another disadvantage that the amount of the lubricating oil in the oil pool chamber is reduced, so that the clamping means cannot be sufficiently lubricated. These disadvantages are completely eliminated in the embodiment of the present invention described above.

As described above, according to the present invention, the oil pool chamber for containing the lubricating oil for the clamping means of the spindle unit is formed to have a closed chamber structure and the bearing portions for supporting the draw bar 9 on both sides thereof are formed to have substantially the same size. Further, as the spindle unit is configured so that the volume of the oil pool chamber does not change even when the clamping means or the unclamping means is activated to move the draw bar 9, the lubricating oil can be kept fully filled in the oil pool chamber.

Also, as the volume of the oil pool chamber remains unchanged, no lubricating oil is pushed out of the oil pool chamber after a long operation and the whole clamping means is always lubricated. As a result, a spindle unit of a machine tool can be provided in which wear and breakage of the draw bar 9 and the disc spring assembly 11, etc. is reduced and a service life of the unit is lengthened.

Further, as at least two passages communicating with the oil pool chamber are formed in the spindle, the lubricating oil in the oil pool chamber can be easily changed, whenever required, using the two passages as the lubricating oil passage and the air passage.

The invention claimed is:

1. A spindle unit of a machine tool for mounting a tool or a workpiece pallet on a forward end of a spindle, comprising:
   a spindle supported by a housing so as be rotatable;
   a clamping device provided in a hollow portion of the spindle and including a draw bar for engaging the tool or the workpiece pallet and an elastic member for pulling the draw bar rearward;
   an unclamping device provided at a rear portion of the spindle for pushing the draw bar forward to thereby release the tool or the workpiece pallet;
   an oil pool chamber formed in the hollow portion of the spindle having a closed chamber structure and including bearing portions for supporting the draw bar on both sides configured so that the draw bar is movable forward and rearward, said bearing portions having substantially the same size so that the volume of the oil pool chamber does not change when the draw bar is moved forward and rearward; and
   at least two passages having inner threads and formed in the spindle communicating between an outside of the spindle and the oil pool chamber, each of said passages being formed at the forward end of the spindle.

2. The spindle unit of a machine tool according to claim 1, wherein the bearing portions comprise a front cylindrical bearing portion for receiving a support shaft portion of the draw bar and a rear cylindrical bearing portion for receiving a shaft collar fixed on the draw bar, and the oil pool chamber is configured such that an inner diameter size of the front cylindrical bearing portion is equal to an inner diameter size of the rear cylindrical bearing portion.

3. The spindle unit of a machine tool according to claim 1, wherein the openings of the passages to the oil pool chamber are formed to be spaced apart from each other at angular interval of about 180 degrees about a center axis of the spindle.

4. The spindle unit of a machine tool according to claim 2, wherein the openings of the passages to the oil pool chamber are formed to be spaced apart from each other at angular interval of about 180 degrees about a center axis of the spindle.

* * * * *